(12) United States Patent
Liu

(10) Patent No.: US 8,572,231 B2
(45) Date of Patent: *Oct. 29, 2013

(54) VARIABLE-LENGTH NONCE GENERATION

(75) Inventor: Likai Liu, Cambridge, MA (US)

(73) Assignee: Google Inc., Mountain View, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/183,028

(22) Filed: Jul. 14, 2011

(65) Prior Publication Data

US 2013/0018911 A1  Jan. 17, 2013

(51) Int. Cl.
*G06F 15/173* (2006.01)

(52) U.S. Cl.
USPC .......................................... 709/223; 709/245

(58) Field of Classification Search
USPC ...................... 709/223–229; 726/2–6, 26–27; 713/155, 159, 168, 172, 182, 185; 707/E17.032, E17.037
See application file for complete search history.

(56) References Cited

U.S. PATENT DOCUMENTS

| | | | |
|---|---|---|---|
| 5,151,697 | A | 9/1992 | Bunton |
| 5,913,217 | A | 6/1999 | Alger et al. |
| 7,165,083 | B2 | 1/2007 | Sakaguchi et al. |
| 7,925,733 | B2 | 4/2011 | Van Vugt |
| 7,930,370 | B2 | 4/2011 | Risbud |
| 8,225,013 | B2 * | 7/2012 | Coile et al. ...................... 710/30 |
| 2001/0017856 | A1 | 8/2001 | Asokan et al. |
| 2003/0093441 | A1 | 5/2003 | Cooke et al. |
| 2003/0163341 | A1 | 8/2003 | Banerjee et al. |
| 2005/0195827 | A1 | 9/2005 | Yao et al. |
| 2006/0158312 | A1 | 7/2006 | Park et al. |
| 2011/0282998 | A1 | 11/2011 | Johnsson et al. |

FOREIGN PATENT DOCUMENTS

GB   2334653   8/1999

OTHER PUBLICATIONS

Bloom et al., "What Is the Best Way to Generate a Unique and Short File Name in Java," Stackoverflow.com, May 6, 2009 pages accessed at http://stackoverflow.com/questions/825678/what-is-the-best-way-to-generate-a-unique-and-short-file-name-in-java, pages accessed on Oct. 8, 2012, 4 pages.
PCT International Search Report, mailed Oct. 16, 2012 and issued in related International Application No. PCT/US2012/046765, 4 pages.
Non-Final Rejection mailed on Jan. 26, 2012 in the prosecution of U.S. Appl. No. 13/245,812, 22 pages.

* cited by examiner

*Primary Examiner* — Brendan Higa
(74) *Attorney, Agent, or Firm* — Sterne, Kessler, Goldstein & Fox P.L.L.C.

(57) ABSTRACT

Methods and systems for obtaining a scalable variable-length nonce are provided. An exemplary method for obtaining a scalable variable-length nonce includes obtaining an initial nonce candidate. The exemplary method also includes transmitting a query to determine whether the initial nonce candidate has already been assigned. When the initial nonce candidate has already been assigned, a combined nonce candidate is obtained. The combined nonce candidate includes characters appended to the initial nonce candidate. An exemplary system for obtaining a scalable variable-length nonce includes a transmitting engine that transmits a request associated with a current token. The exemplary system also includes a receiving engine that receives a message associated with the current token. The exemplary system further includes a token acquiring engine that obtains a new token, and an appending engine that appends the new token to the current token.

20 Claims, 13 Drawing Sheets

500

Transmitter

| Authority | Prefix Range |
|---|---|
| Authority A | 0-4 |
| Authority B | 5-9 |

Authority A

| Assigned Nonces |
|---|
| 0 |
| 3 |
| 4 |
| 35 |
| 35g9 |

Authority B

| Assigned Nonces |
|---|
| 5 |
| 6 |
| 8 |
| 9 |
| 58 |
| 82 |
| 825f |

Authority B1

| Assigned Nonces |
|---|
| 5 |
| 6 |
| 58 |

Authority B2

| Assigned Nonces |
|---|
| 8 |
| 9 |
| 82 |
| 825f |

FIG. 6D

VARIABLE-LENGTH NONCE GENERATION

BACKGROUND

1. Field

This disclosure relates to nonce generation.

2. Related Art

A nonce is a unique identifier that can be used for various purposes. For example, a nonce can also be used for C or C++ header file include guards. A nonce can also be used by Uniform Resource Locator (URL) shortening services to shorten a URL into a shorter URL. Thereafter, the URL can be referred to using the shorter URL. A nonce can also be used by online retailers, electronic service providers, or others to uniquely identify transactions.

One nonce generation scheme in use today is a central entity that increments a counter. For example, an auto-increment counter can be used in a database system and incremented each time a nonce is requested. If the central entity is contended with numerous requests for nonces, the central entity becomes a bottleneck for requests.

Industry standards GUID (globally unique identifier), UUIDv1 (universally unique identifier version 1) and UUIDv4 (universally unique identifier version 4) are identifier standards for distributed nonce generation. The UUID is a randomly generated 128-bit value that is defined such that the chance of two computer systems generating a UUID with the same 128-bit value is small, but uniqueness is not guaranteed, and collision is hard to detect. Further, the length of an identifier used to reduce the probability of collision may be wasteful for some applications. For example, in a database table of key-value pairs keyed by UUID, the size of the value may be smaller than the size of the key.

BRIEF SUMMARY

This disclosure relates to variable-length unique nonce acquisition. Methods, systems, and techniques for obtaining a scalable variable-length nonce are provided. An exemplary method for obtaining a scalable variable-length nonce includes obtaining an initial nonce candidate. The exemplary method also includes transmitting a query to determine whether the initial nonce candidate has already been assigned. When the initial nonce candidate has already been assigned, a combined nonce candidate is obtained. The combined nonce candidate includes characters appended to the initial nonce candidate.

An exemplary system for obtaining a scalable variable-length nonce includes a transmitting engine that transmits a request associated with a current token. The exemplary system also includes a receiving engine that receives a message associated with the current token. The exemplary system further includes a token acquiring engine that obtains a new token, and an appending engine that appends the new token to the current token.

Further embodiments, features, and advantages of the invention as well as the structure and operation of various embodiments of the invention are described in detail below with reference to the accompanying drawings.

BRIEF DESCRIPTION OF THE DRAWINGS

The accompanying drawings, which are incorporated herein and form a part of the specification, illustrate embodiments of the invention and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

FIG. 5A shows an exemplary database that stores authority-prefix range data.

FIG. 5B shows an exemplary database that stores assigned nonces tracked by authority A. FIG. 5C shows an exemplary database that stores assigned nonces tracked by authority B.

FIG. 6C shows an exemplary database that stores assigned nonces tracked by authority B1. FIG. 6D shows an exemplary database that stores assigned nonces tracked by authority B2.

DETAILED DESCRIPTION

This disclosure provides methods, systems, and techniques for obtaining variable-length nonces. The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which the invention would be of significant utility. Therefore, the detailed description is not meant to limit the embodiments described below.

It would be apparent to one of skill in the relevant art that the features described below can be implemented in many different embodiments of software, hardware, firmware, and/or the entities illustrated in the figures. Any actual software code with the specialized control of hardware to implement embodiments is not limiting of this description. Thus, the operational behavior of embodiments will be described with the understanding that modifications and variations of the embodiments are possible, given the level of detail presented herein.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A technique for obtaining a variable-length nonce is provided. A nonce is a unique string of characters that can be used for various purposes such as to identify objects or transactions (e.g., e-mail message identifiers, group discussion identifiers, blog post identifiers, or product identifiers).

A nonce can also be referred to as a unique token, number, identifier, string, expression, symbol, or characters.

Figure 1:
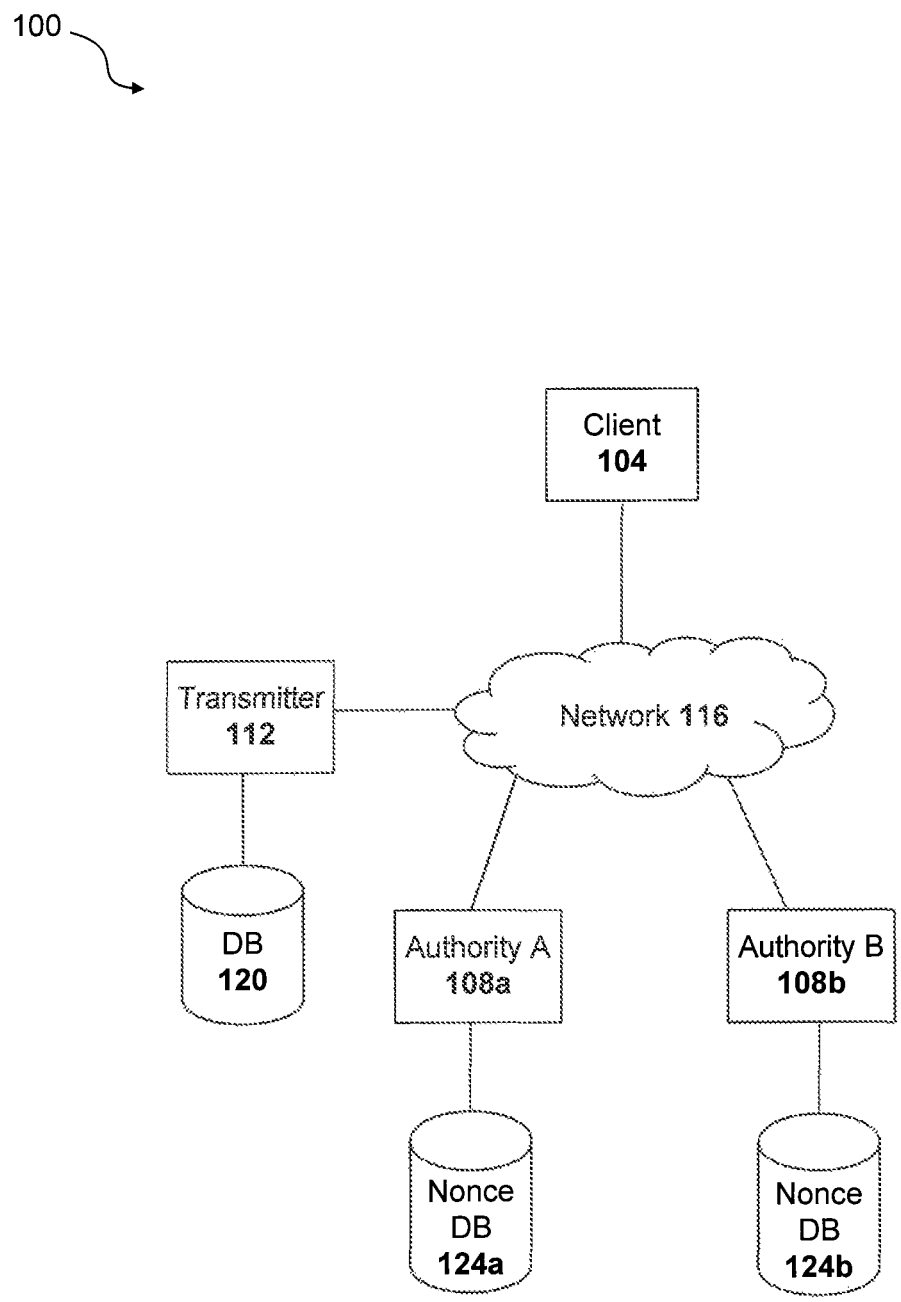
FIG. 1 shows a diagram of an exemplary system for obtaining a variable-length nonce.

FIG. 1 shows a diagram of an exemplary system 100 for obtaining a variable-length nonce. System 100 includes a client 104, authority A 108a, authority B 108b, and a transmitter 112. The client, authorities, and transmitter can directly or indirectly communicate with each other over a network 116. Authority A 108a is coupled to a database 124a and authority B 108b is coupled to a database 124b. Databases 124a and 124b may store nonces that have already been assigned.

Client 104 may obtain a first string or nonce candidate that includes at least one character, and transmit a query to authority A 108a to determine whether the first string has been assigned. The query can include the first string as a parameter along with other information. Authority A 108a determines whether the first string has been assigned by searching in database 124a, which stores assigned nonces.

If the first string is not stored in database 124a, the first string has not been assigned as a nonce. In this case, the request succeeds and the first string is unique and does not collide with existing nonces. If authority A 108a determines that the first string has not been assigned as a nonce, the authority assigns the first string as a nonce by inserting the first string into database 124a. In the future, if the first string is used again as a nonce candidate, authority A 108a will find the first string in database 124a and determine that the first string has already been assigned. An advantage is that this embodiment may prevent a nonce from being assigned more than once and ensure uniqueness.

In one embodiment, to indicate that the first string is unique, authority A 108a transmits a message to client 104 that indicates approval of the first string as a nonce. The approval may indicate a fresh assignment of the first string as a nonce in response to the query. Client 104 receives the message and is informed that the first string can be used as a unique identifier. Thereafter, the nonce can be used to identify an object or transaction.

A race condition may occur if the query for nonce existence and the request for assignment are performed in two separate steps. For example, if a first client and a second client were to simultaneously query the existence of a nonce N, both the first and second clients may be informed that nonce N is available. The first client would claim the nonce candidate, and the second client would also claim the nonce candidate erroneously believing that nonce N is still available.

In some embodiments, authority 108a atomically assigns the string as a nonce. An atomic operation is a set of operations that can be combined such that the set of operations appears to be one single operation to the rest of the system. If one of the operations in the set of operations fails, the atomic operation fails. This may result in a fall rollback, where the data is restored to its state prior to running the atomic operation.

In one embodiment, the atomic operation includes checking the nonce existence of a string and, if the string has not been assigned as a nonce, assigning the string as a nonce. In one embodiment, the atomic operation further includes indicating that the assignment of the string as a nonce is a new assignment. To indicate that the assignment is new, authority A 108a may, for example, report back to client 104 or another component of the system that the assignment is fresh and has not been previously stored in database 124a.

If the first string is stored in database 124a not as a result of this request, the first string has already been assigned as a nonce. In this case, the first string is not unique and collides with an existing nonce. The authority does not assign the nonce candidate as a nonce. In one embodiment, authority A 108a transmits a message to client 104 that indicates the first string has already been assigned. Client 104 receives the message and is informed that the first string cannot be used as a unique identifier. If the first string is not unique, client 104 can obtain a second string that includes at least one character.

Client 104 appends or concatenates the second string to the first string to obtain a first combined string. The first combined string is a new nonce candidate that can be checked for uniqueness. Client 104 can transmit a query to authority A 108a to determine whether the first combined string has been assigned.

Authority A 108a receives the first combined string and determines whether it has been assigned as a nonce. If the first combined string is not stored in database 124a, the first combined string has not been assigned as a nonce yet. Authority A 108a can then assign the first combined string as a nonce. If the first combined string is stored in database 124a not as a result of this request, the first combined string has already been assigned as a nonce. Authority A 108a can then send a message to client 104 that the first combined string is not unique.

In some embodiments, additional characters can be continuously appended to the checked nonce candidates until no collisions occur. The new nonce candidate, which includes a new string appended to the checked nonce candidate, can be referred to as a combined string.

A character can be a letter, digit, symbol, special character, or any combination thereof. In one example, the first string includes at least one random character. In another example, the second string includes at least one random character. A random character can include a character that is generated truly randomly, pseudo-randomly, based on an algorithm, a time of day, a date, or other.

There may be a large number of assigned nonces. Instead of having only one authority that keeps track of all nonces, nonce spaces can be sharded between multiple authorities. In one embodiment, no two databases are responsible for overlapping nonce spaces. In this embodiment, databases 124a and 124b keep track of disjoint nonce spaces. A nonce space tracked by database 124a is not tracked by database 124b, and a nonce space tracked by database 124b is not tracked by database 124a.

System 100 also includes transmitter 112, which is coupled to a database 120. Database 120 can store information regarding which authorities keep track of which nonce spaces. In some embodiments, client 104 sends a request associated with a nonce candidate to transmitter 112. Transmitter 112 can consult database 120 to determine to which authority to forward the request. For example, if transmitter 112 transmits the request to authority A 108a, authority A 108a consults database 124*a* to determine if the nonce candidate has already been assigned. Similarly, if transmitter 112 transmits the request to authority B 108*b*, authority B 108*b* consults database 124*b* to determine if the nonce candidate has already been assigned.

Client 104 may send a request to an authority which is transparently intercepted by transmitter 112. In this embodiment, the client sends a request and may not be aware that the request has been intercepted.

Numerous schemes can be used to locate an appropriate authority to probe for whether a nonce candidate has already been assigned. Client 104 may perform the functionality of transmitter 112. For example, client 104 may maintain a database to determine to which authority a request should be made. This technique may be beneficial when the number of authorities is small and client 104 can maintain the table. In another example, a user device can maintain a lookup table that directs the user device to send a request to a first authority if the token begins with a first digit, send a request to a second authority if the token begins with a second digit, and so on. In another example, client 104 has access to the nonce generation program. The appropriate authorities and lookup table may be coded in the nonce generation program and client 104 finds the appropriate authority in the program. In another embodiment, client 104 randomly picks an authority to perform the nonce generation iteration. This may be done for load-balancing purposes.

A central authority may perform the functions of transmitter 112. For example, client 104 may send a request to the central authority. The central authority can determine if it should respond to the request or transmit the request to another authority.

An authority can be implemented in various ways, such as a physical machine, a virtual machine, a process in an operating system on a multi-processor machine, or a thread in a process.

Although system 100 is described herein with reference to one client, two authorities, and one transmitter, one of skill in the art will recognize that system 100 may have more than one client, more or less than two authorities, and more or less than one transmitter without departing from the spirit and scope of the described embodiments.

Various aspects of embodiments described herein can be implemented by software, firmware, hardware, or any combination thereof. The client can be a general-purpose computer with a processor, local memory, display, and one or more computer input devices such as a keyboard, a mouse and/or a joystick. Alternatively, the client can be a specialized computing device such as, for example, a mobile handset. The client communicates with one or more authorities over one or more networks, such as the Internet. Similar to the client, the authority can be implemented using any general-purpose computer capable of serving data to the client.

Each of the client, authority, or transmitter may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Network 116 can be any network or combination of networks that can carry data communication, and may be referred to herein as a computer network. Such network 116 can include, but is not limited to, a local area network, medium area network, and/or wide area network such as the Internet. Network 116 can support protocols and technology including, but not limited to, World Wide Web protocols and/or services. Intermediate web servers, gateways, or other servers may be provided between components of system 100 depending upon a particular application or environment.

Figure 2:
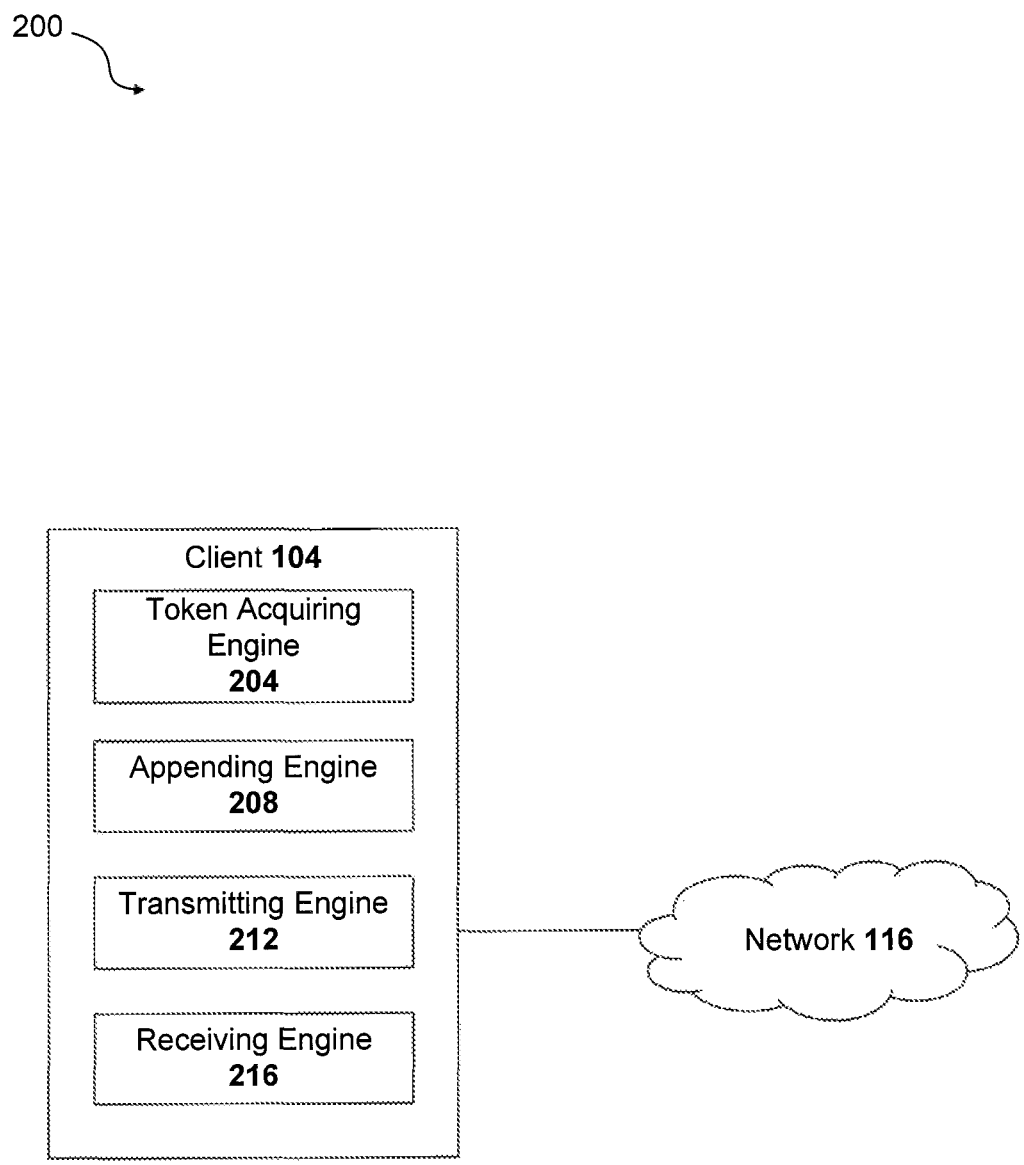
FIG. 2 shows a block diagram of an exemplary computer system for obtaining a variable-length nonce.

FIG. 2 shows a block diagram of an exemplary computer system 200 for obtaining a variable-length nonce. System 200 includes a client 104 that can communicate over network 116. Client 104 includes a token acquiring engine 204, appending engine 208, transmitting engine 212, and receiving engine 216.

Token acquiring engine 204 obtains tokens. In one embodiment, token acquiring engine 204 obtains tokens by generating the tokens. The tokens may be generated according to well-known methods of token generation. In another embodiment, token acquiring engine 204 obtains tokens over network 116 (e.g., from a server via receiving engine 216). A token can be a string that includes at least one character. Token acquiring engine 204 may be coupled to appending engine 208, transmitting engine 212, or both. Transmitting engine 212 may transmit messages over network 116 (e.g., to an authority or transmitter). For example, transmitting engine 212 may transmit a query to determine if a first token obtained by token acquiring engine 204 is unique or has been assigned.

Receiving engine 216 may receive messages over network 116 (e.g., from an authority or transmitter). For example, receiving engine 216 may receive a response associated with the query. In one example, the response can indicate an approval of the first string as a nonce. In this example, the approval may indicate a new assignment in response to the query. In another example, the response can indicate that the first token has already been assigned as a nonce. In this example, no change of assignment status has occurred.

If the response indicates that the first token has already been assigned, token acquiring engine 204 may obtain a second token. Appending engine 208 can append or concatenate the second token to the first token to obtain a first combined token. Appending engine 208 may accept two tokens as input and append the two tokens to obtain the first combined token.

In one embodiment, client 104 receives the assigned first token in response to the query. In this embodiment, appending engine 208 may accept the first token from receiving engine 216 and the second token from token acquiring engine 204, and append these two tokens together. In another embodiment, client 104 keeps track of which nonce candidates have been sent. In this embodiment, appending engine 208 may consult a database for the first token (not shown) and receive the second token from token acquiring engine 204, and append these two tokens together.

The characters appended to a nonce candidate may be randomly generated. An advantage of this technique may be that a uniform random composition of a nonce candidate may effectively serve as a load-balancing mechanism between authorities (more details below).

The second token can be inserted into or appended to the first token at different locations. For example, the second token can be inserted at an end of the first token, at a front of the first token, or anywhere between the front and end of the first token. When the second token is inserted at an end of the first token, the first token appears before the second token in the combined token. Transmitting engine 212 can transmit the combined token over network 116 to check whether the combined token has been assigned.

In some embodiments, the nonce candidate grows each time a collision occurs and another nonce candidate query is made. In one embodiment, at least one character is appended to the nonce candidate (e.g., first token or combined token) when a collision occurs and a nonce candidate query is made. In some embodiments, a nonce candidate grows one digit at a time. In this embodiment, a length of the nonce candidate may increase by one each time a collision occurs and a nonce candidate query is made. Growing a nonce candidate one character at a time may be time consuming.

In another embodiment, a fixed number of characters is appended to the nonce candidate when a collision occurs and a nonce candidate query is made. Multiple characters may be appended when a collision occurs and a nonce candidate query is made. For example, the nonce candidate can grow j digits at a time. In this embodiment, a length of the nonce candidate may increase by j each time a collision occurs and a nonce candidate query is made.

In another embodiment, a different number of characters is appended to the nonce candidate when a collision occurs and a nonce candidate query is made. In one example, a number of characters appended to the nonce candidate increases exponentially when a collision occurs and a nonce candidate query is made. A length of a first obtained token is not greater than a length of a second obtained token. In this example, the nonce candidate can grow exponentially and can be a k-multiple variable length nonce candidate. For example, if an initial nonce candidate has already been assigned, two characters can be obtained and appended to the initial nonce. The new nonce candidate can be checked to determine whether it has been assigned. If it has already been assigned, four characters can be obtained and appended to the checked nonce candidate, then eight characters can be obtained and appended to the checked nonce candidate, and so on until a unique identifier is found.

The longer the identifier length, the lower the probability of collision may be. It may be beneficial, however, to have a shorter string for the advantages discussed above. A generated nonce candidate may tend to be the shortest length possible among the set of nonces already generated.

In one example, a first combined token includes a second token appended to a first token. If the first combined token has already been assigned, a third token is obtained. A second combined token can be obtained by appending the third token to the first combined token. If the second token includes a first number of characters and the third token includes a second number of characters, the second number of characters is greater than the first number of characters.

Note that in alternative embodiments, client 104 may include more or less components than that shown. For example, any subset of the components shown in FIG. 2 may in fact be embodied as a single component. For example, the functionality of token acquiring engine 204 and appending engine 208 may be combined in a single device or module. Other combinations of the functional components of FIG. 2 are also possible as would be known to a person of skill in the art.

In some embodiments, client 104 does not include appending engine 208. In this embodiment, for example, client 104 may include token acquiring engine 204, transmitting engine 212, and receiving engine 216. In one example, token acquiring engine 204 obtains a first token, and transmitting engine 112 transmits a message associated with the first token over network 116 to authority A 108*a*. Receiving engine 216 may receive a response to the message over network 116 that includes a unique nonce. The unique nonce, however, may or may not be the transmitted first token. In this example, authority A 108*a* may determine that the first token has already been assigned and obtain a second token to append to the first token. Authority A 108*a* may continue to check and append to the nonce candidate until no collisions occur and a unique nonce is obtained. When the unique nonce is obtained, authority A 108*a* can transmit a message that indicates a new nonce has been obtained.

Figure 3:
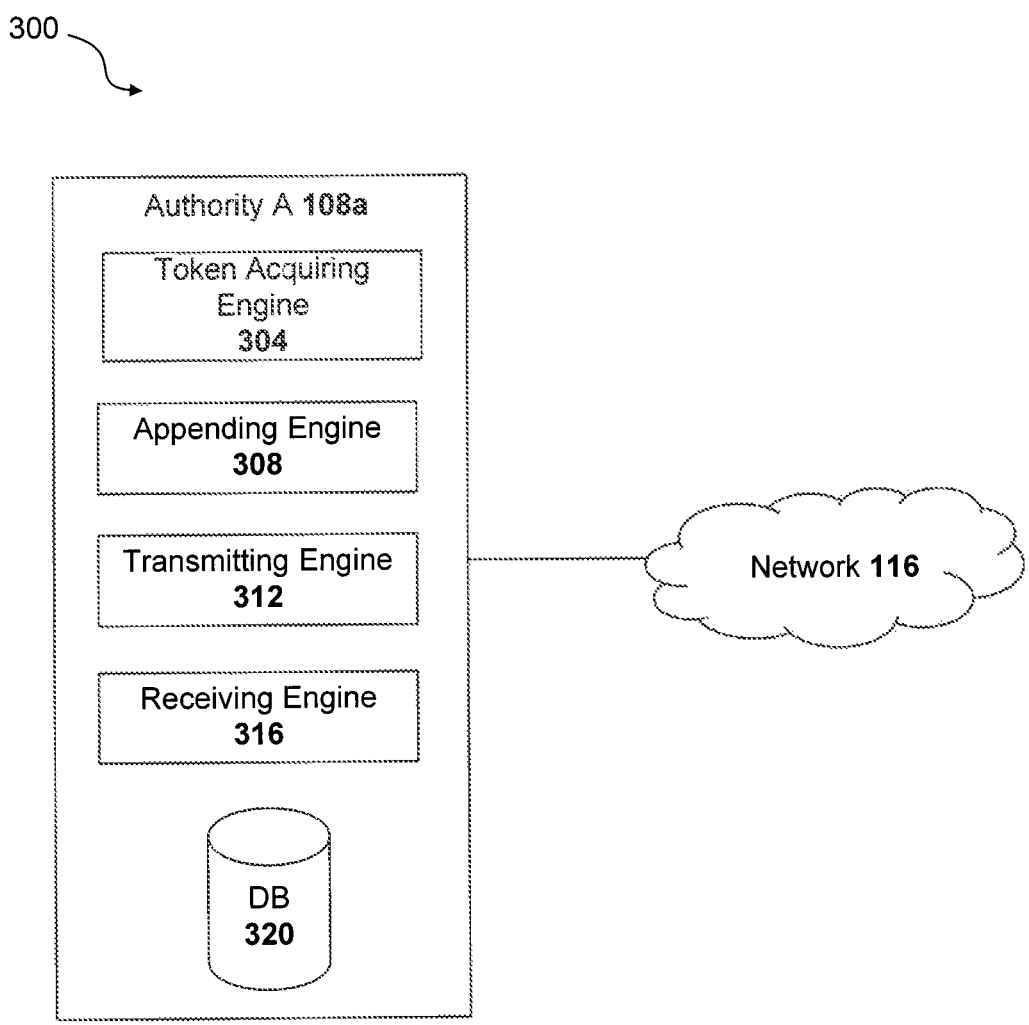
FIG. 3 shows a block diagram of an exemplary computer system for obtaining a variable-length nonce.

FIG. 3 shows a block diagram of an exemplary computer system 300 for obtaining a variable-length nonce. System 300 includes an authority A 108*a* that can communicate over network 116. Authority A 108*a* includes a token acquiring engine 304, appending engine 308, transmitting engine 312, receiving engine 316, and database 320. Database 320 stores nonce assignments.

Receiving engine 316 may receive messages over network 116. Receiving engine 316 receives a query associated with a current token from client 104. The query can include the current token. Authority A 108*a* consults database 320 to determine if the current token has already been assigned as nonce. If the current token has not been assigned as a nonce, authority A 108*a* inserts the current token into database 320 and transmitting engine 312 sends a message to client 104 that indicates approval of the current token. If the current token has already been assigned as a nonce, token acquiring engine 304 may obtain a new token. Appending engine 308 may append the new token to the current token to obtain a combined token. Authority A 108*a* may consult database 320 to determine if the combined token has been assigned. Authority A 108*a* may continue to obtain and append tokens to the combined tokens until a unique nonce is found. Transmitting engine 312 may transmit the unique nonce to client 104.

Note that in alternative embodiments, authority A 108*a* may include more or less components than that shown. For example, any subset of the components shown in FIG. 3 may in fact be embodied as a single component. For example, the functionality of token acquiring engine 304 and appending engine 308 may be combined in a single device or module. Other combinations of the functional components of FIG. 3 are also possible as would be known to a person of skill in the art.

In one embodiment, for example, authority A 108*a* does not include token acquiring engine 304 or appending engine 308. In this embodiment, for example, authority A 108*a* includes transmitting engine 312, receiving engine 316, and database 320. When a token is received and authority A 108*a* determines that the token has already been assigned, transmitting engine 312 can transmit a message to client 104 that indicates the token has already been assigned. Authority A 108*a* may continue to receive queries from client 104 until a unique token is received.

Database 320 stores information about nonce assignments. The client may maintain database 320 in memory. For limited domain applications, the nonce assignments can be stored entirely in main memory.

Nonce assignments can be stored in a general purpose database implemented using a combination of main memory, local hard disk, and network-area storage devices.

In one embodiment, the database is implemented using a file system. The nonce assignments may be stored in the file system. The file system itself could use another scalability scheme such as RAID (redundant array of inexpensive disk) or some form of distributed file system such as NFS (network file system). In this case, the authority is kept simple so that the atomic operation to secure a nonce can be done by invoking a system call to create a file with an exclusive flag so that the system call fails if the file exists. When storing a large collection of files on a file system, a directory tree can be created that distributes the files according to the prefix.

FIGS. 2 and 3 illustrate example computer systems in which the embodiments, or portions thereof, can be implemented as computer-readable code. Various aspects of embodiments described herein can be implemented by software, firmware, hardware, or a combination thereof. In an example, token acquiring engine 204 and appending engine 208 may therefore be implemented as software executing on one or more computing devices. Implementations using programmable hardware may use any commercially available and well-known computer capable of performing the functions described herein.

Various embodiments are described in terms of example computer systems 200 and 300. Computer systems 200 and 300 may include one or more processors. For example, an engine described above can be implemented using a processor (e.g., dual processor or spread across multiple machines). The processor can be a special purpose or a general purpose processor, and can be connected to a communication infrastructure (for example, a bus or network). The computer system also includes a main memory, such as random access memory (RAM), and may also include a secondary memory. The secondary memory may include, for example, a hard disk drive and/or a removable storage drive. The removable storage drive may include a floppy disk drive, a magnetic tape drive, an optical disk drive, a flash memory, or the like. The removable storage drive reads from and/or writes to the removable storage unit in a well-known manner. The removable storage unit may include a floppy disk, magnetic tape, optical disk, etc. which is read by and written to by removable storage drive. As will be appreciated by persons skilled in the relevant art(s), the removable storage unit includes a computer readable storage medium having stored therein computer software and/or data.

In alternative implementations, the secondary memory may include other similar means for allowing computer programs or other instructions to be loaded into computer systems 200 and 300. Such means may include, for example, a removable storage unit and an interface. Examples of such means may include a program cartridge and cartridge interface (such as that found in video game devices), a removable memory chip (such as an EPROM, or PROM) and associated socket, and other removable storage units and interfaces which allow software and data to be transferred from the removable storage unit to computer systems 200 and 300.

Computer systems 200 and 300 may also include a communications interface. A communications interface allows software and data to be transferred between computer system 200 and 300 and external devices. The communications interface may include a modem, a network interface (such as an Ethernet card), a communications port, a PCMCIA slot and card, or the like. Software and data transferred via the communications interface are in the form of signals which may be electronic, electromagnetic, optical, or other signals capable of being received by the communications interface. These signals are provided to the communications interface via a communications path. The communications path carries signals and may be implemented using wire or cable, fiber optics, a phone line, a cellular phone link, an RF link or other communications channels.

In this document, the terms "computer program product" and "computer readable medium" are used to generally refer to storage media such as a removable storage unit, removable storage unit, and a hard disk installed in a hard disk drive. A computer program product and computer readable medium can also refer to one or more memories, such as main memory and secondary memory, which can be memory semiconductors (e.g. DRAMs, etc.). These computer program products are means for providing software to computer systems 200 and 300.

Computer programs (also called computer control logic) are stored in main memory and/or secondary memory. Computer programs may also be received via the communications interface. Such computer programs, when executed, enable computer systems 200 and 300 to implement the embodiments as discussed herein. In particular, the computer programs, when executed, enable the processor to implement the processes of embodiments, such as the steps in the methods discussed below. Accordingly, such computer programs represent controllers of computer systems 200 and 300. Where embodiments are implemented using software, the software may be stored in a computer program product and loaded into computer systems 200 and 300 using a removable storage drive, interface, or hard drive.

Embodiments may also be directed to computer products having software stored on any computer readable medium. Such software, when executed in one or more data processing devices, causes a data processing device(s) to operate as described herein.

Figure 4A:
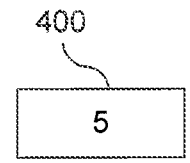
FIG. 4A shows an exemplary string that can be obtained by a token acquiring engine.

FIG. 4A shows an exemplary string 400 that can be obtained by a token acquiring engine. String 400 has a value of "5". String 400 is a nonce candidate that may or may not have already been assigned. A nonce candidate may include characters from a character set. For example, a nonce candidate can be a character within the character set {0, 1, 2, 3, 4, 5, 6, 7, 8, 9}. A nonce prefix can also be defined within a character set. For example, using the character set above, a nonce prefix may only consist of digits.

At least one authority is delegated to keep track of issued nonces. The number of delegated authorities can depend on many factors, such as the expected number of nonces to be stored, the memory space available, the processing power of an authority, or other factors. In one embodiment, each authority keeps track of only the issued nonces within its nonce space. In this embodiment, the nonce space maintained by a first authority is disjoint from the nonce space maintained by a second authority. The nonce space can be determined by different characteristics of a nonce, such as a nonce prefix or length of the nonce. In FIG. 1, two authorities are delegated to keep track of issued nonces. Transmitter 112 is coupled to database 120, which keeps track of authorities and nonce spaces. Database 120 can store authority-prefix range data, according to an embodiment.

FIG. 5A shows an exemplary database 500 that stores authority-prefix range data. In this figure, database 500 stores information about two authorities, authority A and authority B. For example, authorities A and B store nonces that have a prefix within a predetermined character set {0, 1, 2, 3, 4, 5, 6, 7, 8, 9}. In FIG. 5A, authority A is delegated to track issued nonces having a prefix range of 0-4. In other words, nonces starting with digits 0-4 are handled by authority A. Authority B is delegated to track issued nonces having a prefix range of 5-9. In other words, nonces starting with digits 5-9 are handled by authority B.

FIG. 5B shows an exemplary database 504 that stores assigned nonces tracked by authority A. FIG. 5C shows an exemplary database 508 that stores assigned nonces tracked by authority B. As shown in FIG. 5B, database 504 has multiple entries of nonces having prefixes ranging between 0-4. In particular, strings 0, 3, 4, 35, and 35g9 have been assigned as nonces. As shown in FIG. 5C, database 508 has multiple entries of nonces having prefixes ranging between 5-9. In particular, strings 5, 6, 8, 9, 58, 82, and 825f have been assigned as nonces.

When transmitter 112 receives a request to determine if string 400 is unique, transmitter 112 determines based on the prefix of string 400 to which authority to direct the request. Because string 400 has a prefix between the range 5-9, transmitter 112 will direct the request to authority B. When authority B receives the request, authority B checks to see if string 400 has already been assigned. As shown in FIG. 5C, a first entry in database 508 is "5". So string 400 has already been assigned. Client 104 receives a message associated with the request that indicates string 400 has already assigned.

Client 104 can be informed of this in various ways. For example, authority B sends a response to client 104 that indicates the string is not unique and no new assignment has occurred. Client 104 can then proceed to obtain another string and append it to the checked string. In another embodiment, authority B sends a response to client 104 that indicates a new assignment with a different string has occurred. In this case, the initial string was already assigned and authority B then proceeded to obtain another string and append it to the checked string. In another embodiment, authority B sends a message to transmitter 112 that indicates string 400 has already been assigned. In turn, transmitter 112 will send a message to client 104 that indicates the string has already been assigned.

Figure 4B:
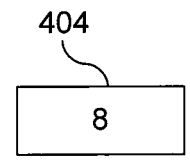
FIG. 4B shows an exemplary string that can be obtained by a token acquiring engine.
Figure 4C:
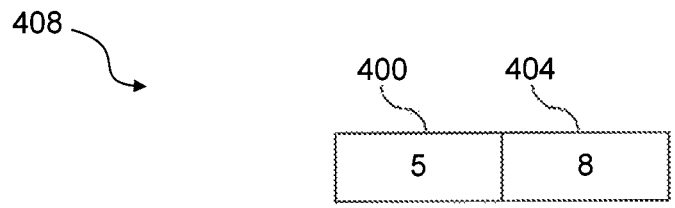
FIG. 4C shows an exemplary combined string.

FIG. 4B shows an exemplary string 404 that can be obtained by a token acquiring engine. String 404 has a value of "8". FIG. 4C shows an exemplary combined string 408. Combined string 408 includes string 404 appended to an end of string 400. Combined string 408 is a nonce candidate and may or may not have already been assigned as a nonce.

Since the nonce prefix is the same for string 400 and combined string 408 (e.g., 5), the same authority (e.g., authority B) determines if the nonce candidate is unique. Authority B checks to see if combined string 408 has already been assigned. As shown in FIG. 5C, a fifth entry in database 508 is "58". So combined string 408 has already been assigned. Since the nonce candidate, combined string 408, has already been assigned, another string can be obtained.

Figure 4D:
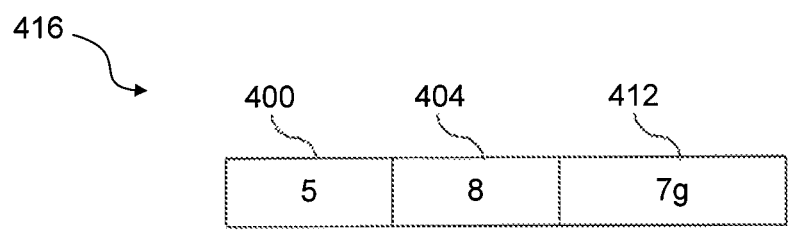
FIG. 4D shows an exemplary combined string.

FIG. 4D shows an exemplary combined string 416. Combined string 416 includes a string 412 appended to an end of combined string 408 (or the checked nonce candidate). Combined string 416 is a nonce candidate and may or may not have already been assigned as a nonce.

Since the nonce prefix is the same for combined string 408 and combined string 416 (e.g., 5), the same authority (e.g., authority B) determines if the nonce candidate is unique. Authority B checks to see if combined string 416 has already been assigned. As shown in FIG. 5C, there are no entries in database 508 that have combined string 416. This indicates that combined string 416 has not yet been assigned and can be approved as a nonce. Authority B can indicate approval of combined string 416 as a new assignment, and can insert combined string 416 into database 508.

Each unique nonce candidate may result in queries that read from or insert information into a database. A database may become very slow after data continue to grow. A database may be split between two or more authorities. For example, when it is determined to scale an authority, the nonce space associated with an authority can be split between at least two authorities.

Figure 6A:
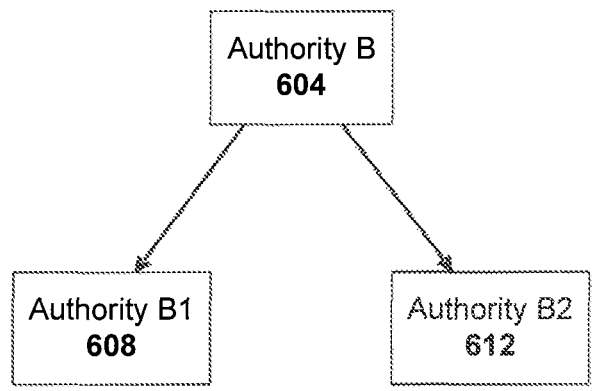
FIG. 6A shows a diagram of an exemplary nonce space split between two authorities.

FIG. 6A shows a diagram of an exemplary nonce space split between two authorities. The nonce space associated with and handled by authority B 604 is divided and will be handled by an authority B1 608 and an authority B2 612.

Figure 6B:
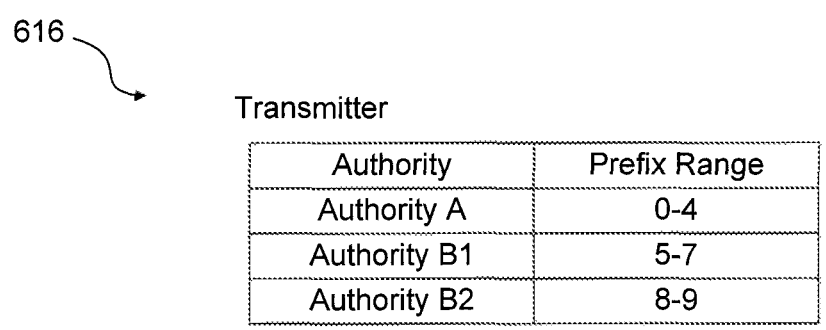
FIG. 6B shows an exemplary database that stores authority-prefix range data after a nonce space split.

FIG. 6B shows an exemplary database 616 that stores authority-prefix range data after a nonce space split. In FIG. 6B, database 616 stores information about three authorities, authority A, authority B1, and authority B2. Authority A is delegated to track issued nonces having a prefix range of 0-4. Authority B1 is delegated to track issued nonces having a prefix range of 5-7. Authority B2 is delegated to track issued nonces having a prefix range of 8-9.

Referring back to FIG. 5A, authority B handles a nonce-prefix range of 5-9. As shown in FIG. 6B, the nonce-prefix range previously handled by authority B (e.g., 5-9) in FIG. 5A is split and will be handled by authority B1 (e.g., 5-7) and authority B2 (e.g., 8-9). After the split, at least one entry associated with authority B 604 is transferred or moved to authority B1 608. As a result, authority B1 608 stores at least one nonce that was stored by authority B 604.

FIG. 6C shows an exemplary database 620 that stores assigned nonces tracked by authority B1. FIG. 6D shows an exemplary database 624 that stores assigned nonces tracked by authority B2.

Referring back to FIG. 5C, authority B has seven assigned nonce entries in database 508—5, 6, 8, 9, 58, 82, and 825f. These nonce entries are split between authority B1 608 and authority B2 612. Authority B1 608 handles nonces having digits starting with 5, 6, or 7, and authority B2 612 handles nonces having digits starting with 8 or 9. In particular, as shown in FIG. 6C, authority B1 has multiple entries in database 620 of nonces having prefixes ranging between 5-7. Nonces having a prefix range between 5-7 (e.g., 5, 6, and 58) are tracked by authority B1 (see FIG. 6C). As shown in FIG. 6D, authority B2 has multiple entries in database 624 of nonces having prefixes ranging between 8-9. Nonces having a prefix range between 8-9 (e.g., 8, 9, 82, and 825f) are tracked by authority B2 (see FIG. 6D).

Authority B 604 and authority B1 608 may be the same authority. Only those entries having a prefix range between 8-9 are moved to authority B2 612, and the other entries having a prefix range between 5-7 remain with authority B. The moved entries may be deleted from authority B 604 such that authority B 604 no longer stores the moved entries.

When transmitter 112 receives a nonce request, the transmitter consults database 616 and determines to which authority a request should be transmitted. For example, if a nonce candidate has a value of "79h", the prefix of the nonce candidate is "7". Transmitter 112 forwards this request to authority B1. In another example, if a nonce candidate has a value of "8xe25h", the prefix of the nonce candidate is "8". Transmitter 112 forwards this request to authority B2.

Nonce prefixes are obtained from a character set. For example, when a nonce candidate is obtained, a character in a predetermined character set can be picked in random, uniform distribution. Many programming languages are able to generate psuedo-random numbers which are effectively distributed according to the standard uniform distribution. Other distributions other than a random, uniform distribution may be used. For example, in one implementation, a normal distribution can be used.

Further, nonce spaces can be split under a variety of circumstances. For example, a nonce space of a database can be split when the database stores a threshold amount of data in the database.

A nonce prefix includes at least one character. In FIG. 6B, a prefix includes a single-digit prefix (e.g., authority A keeps track of nonces having a prefix range between 0-4, authority B1 keeps track of nonces having a prefix range between 5-7, and authority B2 keeps track of nonces having a prefix range between 8-9).

Further, a prefix can be any character such as a letter, digit, symbol, special character, or other. A prefix can include any character (e.g., from a character set). For example, a first authority stores nonces having a first character within character set {*, #, $} and a second authority stores nonces having a first character within character set {@, !, ?, &}. Other characters can also be used. Further, a nonce space can be divided using varying prefixes. For example, an authority has a prefix range of a-iri, irj-riq, or rir-z. In another embodiment, a first authority has a prefix range of A-C and M-Z and a second authority has a prefix range of D-L.

A prefix can have any number of characters. In some embodiments, a prefix may include at least two characters. For example, a first authority can keep track of nonces having a prefix range between AA-MA, and a second authority can keep track of nonces having a prefix range between MB-ZZ. If the first authority stores a threshold amount of data, the nonce space tracked by the first authority is split. In this embodiment, the first authority can continue to keep track of nonces having a prefix range between AA-FA, and a third authority can keep track of nonces having a prefix range between FB-MA. An advantage of this technique is that it provides for a scalable nonce generation scheme where an authority is scalable and a unique nonce is obtained.

Further, a prefix can include different types of characters that are checked. For example, a prefix includes a first character that is a letter and a second character that is a digit. A first authority stores nonces that have a first character within a prefix range of A-F and a second character within a prefix range of 0-2, a second authority stores nonces that have a first character within a prefix range of A-F and a second character within a prefix range of 3-8, and so on.

Furthermore, different techniques may be used to determine an appropriate authority. A nonce space is not limited to being divided according to a prefix range of a nonce. A nonce space can be divided using other factors. For example, a nonce space is split based on the last two characters of a nonce. It is to be appreciated that other schemes to split a nonce space can be used. In another embodiment, transmitter 112 transmits a request to an appropriate authority based on proximity of the authorities to the transmitter. In another embodiment, transmitter 112 randomly transmits a request to an authority. This may be used as a load-balancing technique.

A nonce may be associated with additional information such as a product or customer name. When a nonce is newly assigned, it is entered into a database. When an existing nonce is found, the existing nonce is unmodified. An authority can store associated data with the nonce, which allows later retrieval of the data using the nonce as the key. A nonce may be used as a primary key to identify an object (e.g., product or customer name) in a database. The nonce may be a customer number to identify a customer and the nonce (e.g., customer number) can be stored with the customer in the database. In another example, a nonce is a short URL that can be stored with its associated longer URL.

The nonce may also be associated with metadata such as a date and time the nonce was issued, which authority issued the nonce, or other information pertaining to the nonce. The metadata can be stored in the database and associated with the nonce.

Further, when determining whether a nonce candidate has already been assigned, an authority implements a lookup method to determine nonce existence in its own nonce space. In FIGS. 5A-5C and 6B-6D, the databases that store the nonce information are described as tables. Other data structures may also be used such as a binary search tree, array, B-tree, or other. Some data structures may be more efficient or less costly than others to implement depending on such factors as the expected amount of unique identifiers, programming manpower, or the processing power of the client or server.

The disclosed system(s) may provide for fast generation of a nonce. A scalable storage backend may include distributed data on multiple backend servers. In one embodiment, a scalable storage backend has an O(lg n) lookup time. A one-character identifier is randomly generated and an authority performs a search in the storage backend for the identifier. If the identifier is not found, the identifier is inserted. Otherwise another character is generated and appended to the existing identifier. The authority performs another search in the storage backend for the new string. This continues until no collisions occur. If n is the number of nonces already generated and the random number generation is O(1) time, the time to look up an existing nonce is O(lg n). Further, the number of generated digits is also O(lg n). In this case, the running time to generate a nonce is O(lg n*lg n). In another embodiment, the storage backend is sharded to parallelize the lookup. Sharding the storage backend may include partitioning the storage backend and spreading the partitions across distributed servers.

Figure 7:
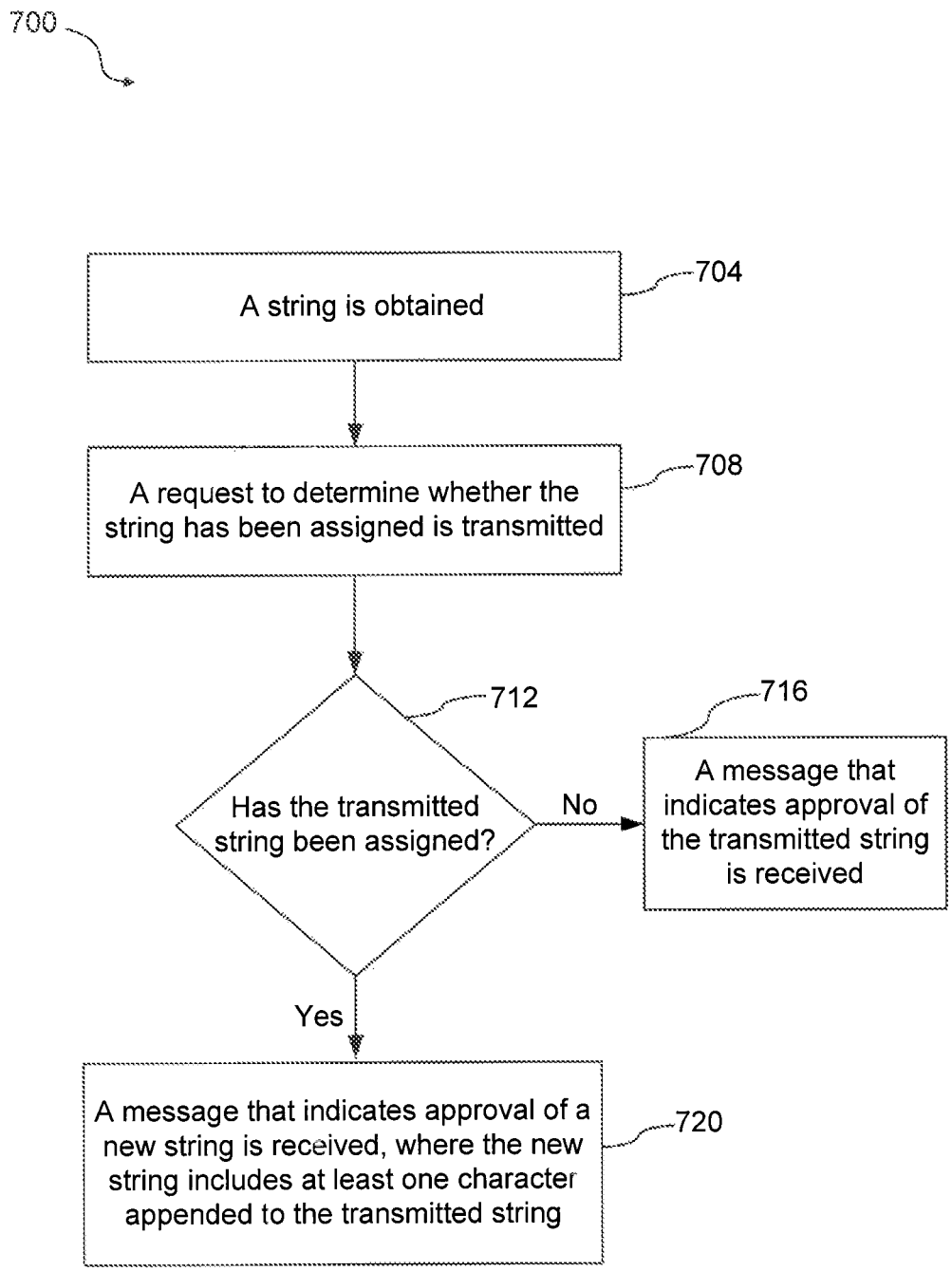
FIG. 7 shows a flowchart illustrating an exemplary method for obtaining a variable-length nonce.
Figure 8:
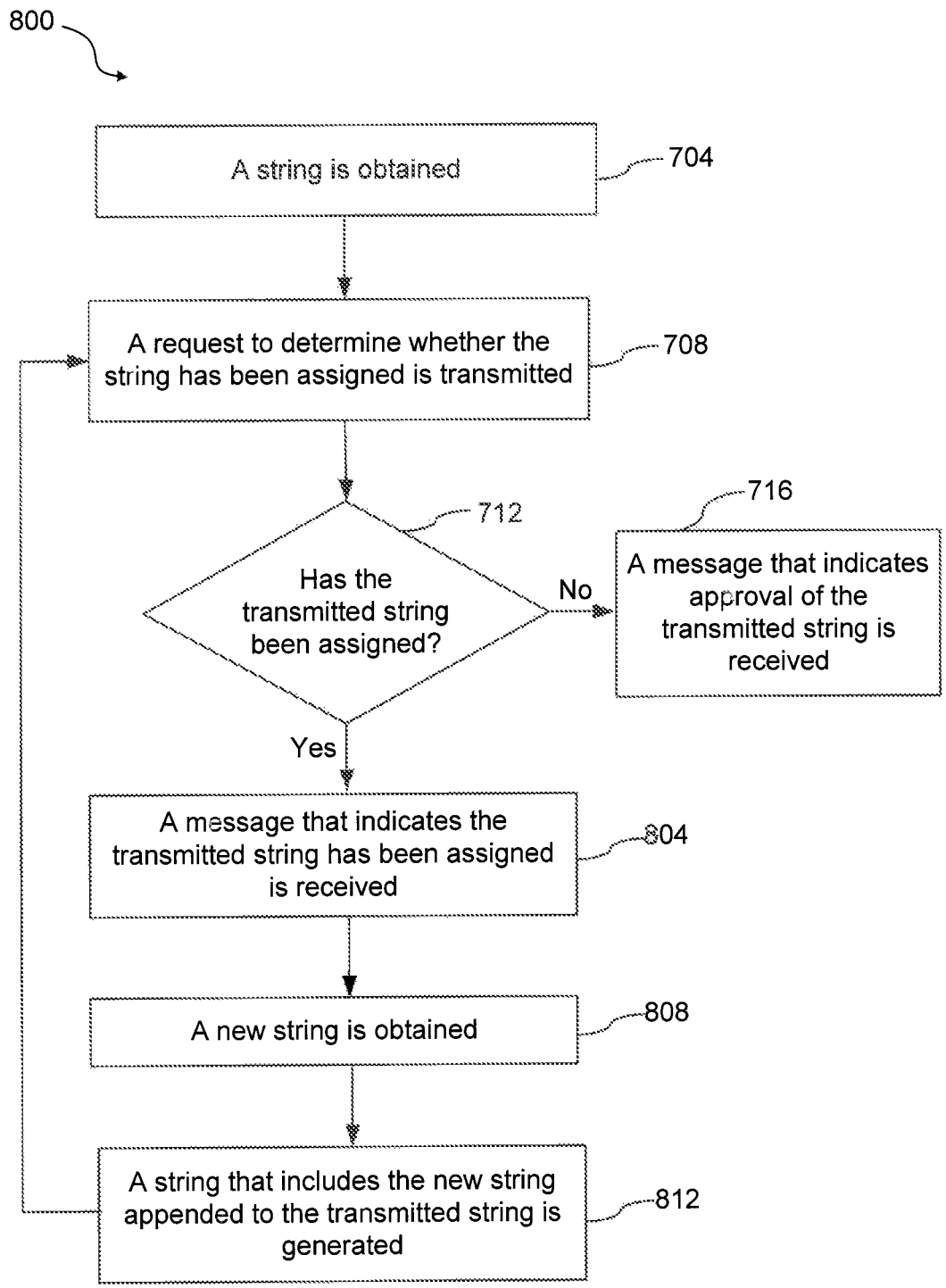
FIG. 8 shows a flowchart illustrating another exemplary method for obtaining a variable-length nonce.

FIG. 7 shows a flowchart illustrating an exemplary method 700 for obtaining a variable-length nonce. FIG. 8 shows a flowchart illustrating an exemplary method 800 for obtaining a variable-length nonce. Methods 700 and 800 are not meant to be limiting and may be used in other applications. For example, methods 700 and 800 may be used to obtain a variable-length nonce, like systems 200 and 300 of FIGS. 2 and 3. However, methods 700 and 800 are not meant to be limited to systems 200 and 300.

As shown in FIG. 7, exemplary method 700 includes a stage 704 where a string is obtained. In one embodiment, token acquiring engine 204 obtains the string. In another embodiment, receiving engine 216 obtains the string. At a stage 708, a request is transmitted to determine if the string has been assigned. Transmitting engine 212 transmits the request.

At a stage 712, it is determined if the transmitted string has been assigned. At a stage 716, if the transmitted string has not been assigned, a message is received that indicates approval of the transmitted string. Receiving engine 216 receives the message.

At a stage 720, if the transmitted string has been assigned, a message is received that indicates approval of a new string. The new string may include at least one character appended to the transmitted string. The authority may return an alternative string, different from the string the client transmitted, as a nonce. This may be advantageous when the client has low processing power or has limited memory. For example, if the transmitted string has already been assigned, the authority may perform an algorithm to obtain a nonce and then send a message that indicates approval of the nonce to the client.

The new string may include at least one random character appended to the transmitted string. Receiving engine 216 receives the message. Stages 704-720 may be implemented as software, hardware, firmware, or any combination thereof.

In FIG. 8, exemplary method 800 includes stages 704, 708, 712, and 716 described above. At a stage 804, if the transmitted string has been assigned, a message is received that indicates the transmitted string has been assigned. At a stage 808, a new string is obtained. At a stage 812, a string is generated that includes the new string appended to the transmitted string. The process flow of the method then proceeds to stage 708, where a request is transmitted to determine if the string that includes the new string appended to the transmitted string has been assigned.

Figure 9:
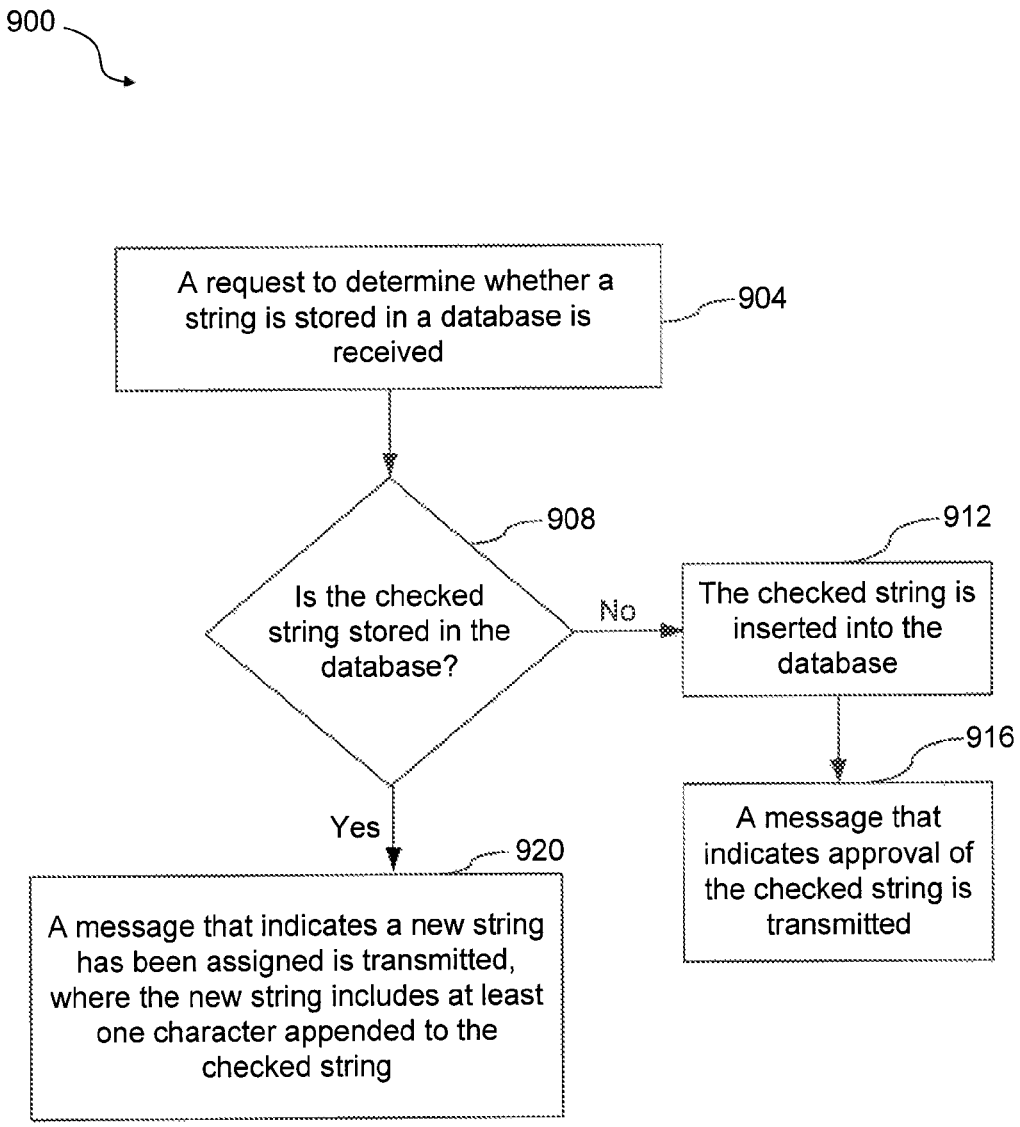
FIG. 9 shows a flowchart illustrating another exemplary method for obtaining a variable-length nonce.
Figure 10:
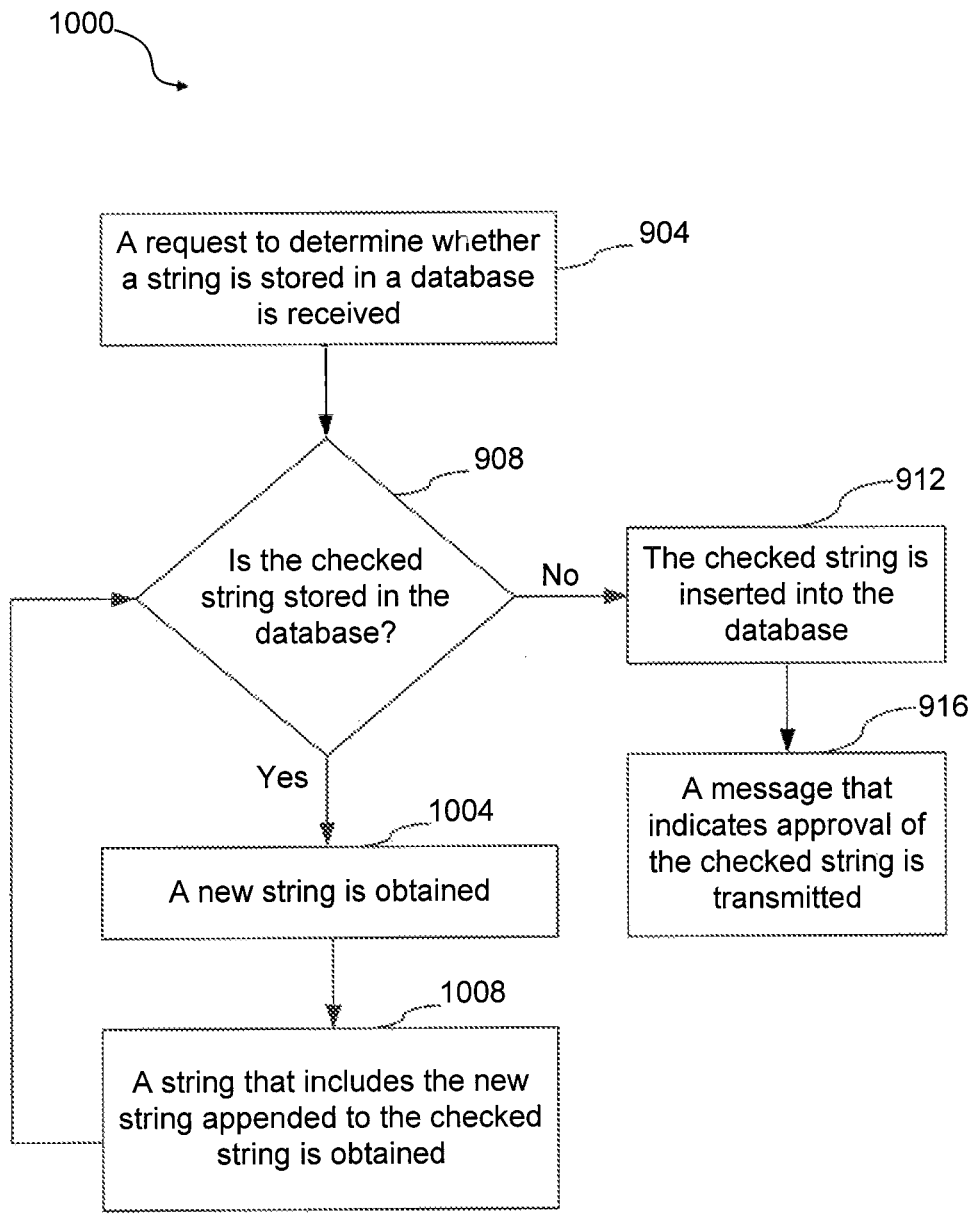
FIG. 10 shows a flowchart illustrating another exemplary method for obtaining a variable-length nonce.
Figure 11:
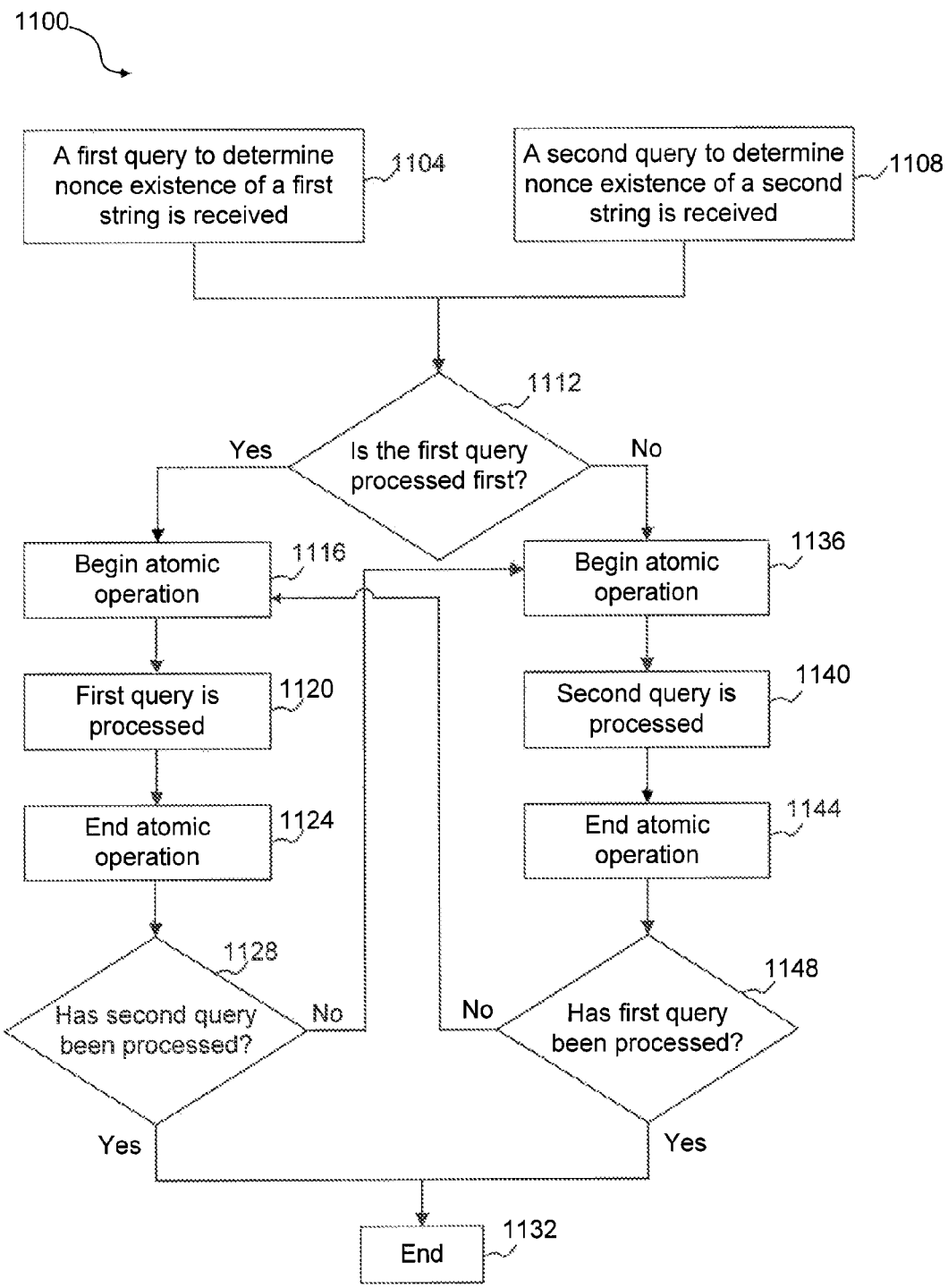
FIG. 11 shows a flowchart illustrating another exemplary method for obtaining a variable-length nonce.

FIG. 9 shows a flowchart illustrating another exemplary method 900 for obtaining a variable-length nonce. FIG. 10 shows a flowchart illustrating another exemplary method 1000 for obtaining a variable-length nonce. FIG. 11 shows a flowchart illustrating another exemplary method 1100 for obtaining a variable-length nonce. Methods 900, 1000, and 1100 are not meant to be limiting and may be used in other applications. For example, methods 900, 1000, and 1100 may be used to obtain a variable-length nonce, like systems 200 and 300 of FIGS. 2 and 3. However, methods 900, 1000, and 1100 are not meant to be limited to systems 200 and 300.

As shown in FIG. 9, exemplary method 900 includes a stage 904 where a request to determine if a string is stored in a database is received. At a stage 908, it is determined if the string is stored in the database. At a stage 912, if the checked string is not stored in the database, the checked string is inserted into the database. In this case, the checked string may be issued as a nonce. At a stage 916, a message is transmitted that indicates approval of the checked string.

At a stage 920, if the checked string is stored in the database, a message is transmitted that indicates a new string has been assigned. The new string may be different from the checked string. The new string includes at least one character appended to the checked string. At least one character that is appended to the checked string may be a random character.

In FIG. 10, exemplary method 1000 includes stages 904, 908, 912, and 916 described above. At a stage 1004, if the checked string is stored in the database, a new string is obtained. At a stage 1008, a string that includes the new string appended to the checked string is obtained. The process flow of the method then proceeds to stage 908, where it is determined if the string that includes the new string appended to the checked string is stored in the database.

The exemplary method of FIG. 11 may prevent the occurrence of race conditions. In FIG. 11, exemplary method 1100 includes a stage 1104 where a first query to determine nonce existence of a first string is received. At a stage 1108, a second query to determine nonce existence of a second string is received. At a stage 1112, it is determined if the first query is processed first.

If it is determined that the first query is processed first, process flow of the method then proceeds to a stage 1116. If it is determined that the first query is not processed first, process flow of the method then proceeds to a stage 1136.

At stage 1116, an atomic operation begins. At a stage 1120, the first query is processed. In some embodiments, processing the first query includes determining if the first sting has been assigned as a nonce, and if the first string has not been assigned, assigning the first string as a nonce. Processing the first query may further include indicating that the assignment of the first string as a new nonce is a new assignment. At a stage 1124, the atomic operation ends. At a stage 1128, it is determined if the second query has been processed. If the second query has been processed, process flow of the method then proceeds to stage 1132 and the process ends. If the second query has not been processed, process flow of the method then proceeds to stage 1136.

At stage 1136, an atomic operation begins. At stage 1140, the second query is processed. In some embodiments, processing the second query includes determining if the second sting has been assigned as a nonce, and if the second string has not been assigned, assigning the second string as a nonce. Processing the second query may further include indicating that the assignment of the second string as a new nonce is a new assignment. At a stage 1144, the atomic operation ends. At a stage 1148, it is determined if the first query has been processed. If the first query has been processed, process flow of the method then proceeds to stage 1132 and the process ends. If the first query has not been processed, process flow of the method then proceeds to stage 1116.

Rather than having a long unique identifier of a set length (e.g., 128 bits), a short unique identifier may be provided when possible. A length of an initial nonce candidate may grow until a unique nonce is found such that the length tends to be short when possible. The variable-length identifiers may mitigate the amount of storage required to store a unique identifier.

The identifier may be truly unique rather than just having a high probability of uniqueness.

Different authorities may be set up to track a nonce having a given prefix. The prefix can be a first number of characters of a nonce candidate or token (e.g., first character, first two characters, first three characters, etc.). A request can be directed to the appropriate authority based on the prefix. Such a technique may be scalable. This may allow nonce generation for applications that will scale gracefully in the number of unique nonces as well as scale gracefully in terms of servicing concurrent nonce assignment requests.

When an authority keeps track of a threshold number of nonces, the nonce space can be split and other authorities added. When an authority is overloaded, the number of authorities tracking a nonce space can be increased and the database split between two or more authorities. If servers are allocated based on the prefix range, the database can be split based on the prefix range.

When one or more collisions occur for a particular request, it is likely the same authority will be used to check if the nonce candidate has been assigned if the first couple of characters stay the same. As such, it becomes unnecessary for the system to look up which authority to send its requests to each time a new nonce candidate is checked.

Further, an embodiment may have caching implications when sending and receiving messages over a network. For example, if a different server is used in a subsequent query, a domain name system (DNS) lookup is performed for the different server, and a Transmission Control Protocol (TCP) connection is established with the different server. However, if the same server is used, a DNS lookup is unnecessary, and the same TCP connection can be reused, saving handshaking time.

Further, the low probability of collisions may be leveraged to achieve scalability. The collision space may be big and the chance of collision may be low.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method for obtaining a nonce, comprising:

determining a nonce space of a first string comprising at least one character;

when the first string is within a given nonce space, sending a request for a nonce to an authority that tracks nonces within the given nonce space;

when the first string is within the given nonce space, determining whether the first string has been assigned as a nonce in a database;

when it is determined that the first string has been assigned as a nonce in the database, generating a combined string by appending a second string having at least one character to the first string;

determining whether the combined string has been assigned as a nonce in the database, the combined string being within the given nonce space; and when it is determined that the combined string has not been assigned as a nonce in the database, assigning the combined string as a nonce in the database.

2. The method of claim 1, further comprising:

when the first string is within a second nonce space disjoint from the given nonce space, sending a request for a nonce to a second authority that tracks nonces within the second nonce space;

when the first string is within the second nonce space, determining whether the first string has been assigned as a nonce in a second database;

when it is determined that the first string has been assigned as a nonce in the second database, generating a second combined string by appending a third string having at least one character to the first string;

determining whether the second combined string has been assigned as a nonce in the second database, the second combined string being within the second nonce space; and when it is determined that the second combined string has not been assigned as a nonce in the second database, assigning the second combined string as a nonce in the second database.

3. The method of claim 2, wherein the first and second authorities are at least one of a physical machine, virtual machine, a process in an operating system on a multiprocessor machine, or a thread in a process.

4. The method of claim 2, wherein the first and second authorities reside on different physical machines.

5. The method of claim 1, wherein the second string is appended at an end of the first string.

6. The method of claim 1, wherein the nonce space of the first string is based on a prefix of the first string.

7. The method of claim 6, wherein the first string and the combined string have a same prefix.

8. The method of claim 1, further comprising generating the second string, the second string having at least one random character.

9. The method of claim 1, wherein assigning the combined string as a nonce comprises atomically assigning the combined string as a nonce.

10. The method of claim 1, further comprising:

when it is determined that the first combined string has been assigned as a nonce in the database, generating a second combined string, wherein generating the second combined string comprises appending a third string to the first combined string, wherein the second string comprises a first number of characters, the third string comprises a second number of characters, and the second number of characters is greater than the first number of characters.

11. The method of claim 10, wherein the second string comprises N characters and the third, string comprises N*2 characters.

12. The method of claim 1, further comprising:

determining whether an amount of data in the database exceeds a threshold;

when it is determined that the amount of data in the database exceeds the threshold, splitting the given nonce space into a second nonce space and a third nonce space; and moving the data associated with the third nonce space from the database to a second database different from the first database, wherein the second database tracks nonces within the third nonce space.

13. A system for obtaining a nonce, comprising:

at least one computing device comprising a processor and memory;

a transmitter, implemented on the computing device, and configured to:

(i) determine a nonce space of a first string comprising at least one character, and (ii) when the first string is within a given nonce space, send a request for a nonce to an authority that tracks nonces within the given nonce space; and the authority, implemented on the computing device, configured to:

(i) when the first string is within the given nonce space, determine whether the first string has been assigned as a nonce in a database, (ii) when it is determined that the first string has been assigned as a nonce in the database, generate a combined string, wherein when the authority generates the combined string, the authority is configured to append a second string comprising at least one character to the first string, (iii) determine whether the combined string has been assigned as a nonce in the database, the combined string being within the given nonce space, and (iv) when it is determined that the combined string has not been assigned as a nonce in the database, assign the combined string as a nonce in the database.

14. The system of claim 13, wherein the transmitter is configured to when the given string is within a second nonce space disjoint from the given nonce space, send a request for a nonce to a second authority that tracks nonces within the second nonce space, the system further comprising:

a second authority, implemented on the computing device, and configured to:

(i) when the first string is within the second nonce space, determine whether the first string has been assigned as a nonce in a second database, (ii) when it is determined that the first string has been assigned as a nonce in the second database, generate a second combined string, wherein when the second authority generates the second combined string, the second authority is configured to append a third string having at least one character to the first string, (iii) determine whether the second combined string has been assigned as a nonce in the second database, the second combined string being within the second nonce space, and (iv) when it is determined that the second combined string has not been assigned as a nonce in the second database, assign the second combined string as a nonce in the second database.

15. The system of claim 14, wherein the first and second authorities reside on different physical machines.

16. The system of claim 13, wherein the authority is configured to append the second string to an end of the first string.

17. A computer readable storage device encoded with a computer program, the program comprising instructions that when executed by one or more processors cause the one or more processors to perform operations comprising:
- determining a nonce space of a first string comprising at least one character;
- when the first string is within a given nonce space, sending a request for a nonce to an authority that tracks nonces within the given nonce space;
- when the first strung is within the given nonce space, determining whether the first string has been assigned as a nonce in a database;
- when it is determined that the string has been assigned as a nonce in the database, generating a combined string by appending a second string having at least one character to the first string;
- determining whether the combined string has been assigned as a nonce in the database, the combined string being within the given nonce space; and
- when it is determined that the combined string has not been assigned as a nonce in the database, assigning the combined string as a nonce in the database.

18. The computer readable storage device of claim 17, the operations further comprising:
- when the first string is within a second nonce space disjoint from the given nonce space, sending a request for a nonce to a second authority that tracks nonces within the second nonce space;
- when the first string is within the second nonce space, determining whether the first string has been assigned as a nonce in a second database;
- when it is determined that the first string has been assigned as a nonce in the second database, generating a second combined string by appending a third string having at least one character to the first string;
- determining whether the second combined string has been assigned as a nonce in the second database, the second combined string being within the second nonce space; and
- when it is determined that the second combined string has not been assigned as a nonce in the second database, assigning the second combined string as a nonce in the second database.

19. The computer readable storage device of claim 17, wherein the nonce space of the first string is based on a prefix of the first string.

20. The computer readable storage device of claim 17, the operations further comprising:
- determining whether an amount of data in the first database exceeds a threshold;
- when it is determined that the amount of data in the first database exceeds the threshold, splitting the given nonce space into a second nonce space and a third nonce space; and
- moving the data associated with the third nonce space from the first database to a second database different from the first database, wherein the second database tracks nonces within the third nonce space.

* * * * *